United States Patent [19]

Killmeyer

[11] 4,307,979
[45] Dec. 29, 1981

[54] MINE ROOF BOLT AND END CAP

[75] Inventor: Charles W. Killmeyer, Pittsburgh, Pa.

[73] Assignee: PPG Industries, Inc., Pittsburgh, Pa.

[21] Appl. No.: 144,760

[22] Filed: Apr. 28, 1980

Related U.S. Application Data

[62] Division of Ser. No. 969,528, Dec. 14, 1978, Pat. No. 4,247,224.

[51] Int. Cl.³ .................. E21D 20/02; E21D 21/00
[52] U.S. Cl. .................................. 405/259; 405/261; 411/373; 411/425
[58] Field of Search .............. 405/260, 261, 259; 85/1 R, 32 R, 47; 264/562, 174, 295; 151/14.5; 411/373, 377, 425, 411; 52/156, 698, 704, 707

[56] References Cited

U.S. PATENT DOCUMENTS

| | | | |
|---|---|---|---|
| 2,949,054 | 8/1960 | White | 85/47 |
| 3,283,050 | 11/1966 | Boggs | 264/137 |
| 3,441,637 | 4/1969 | Davis | 264/95 |
| 3,641,772 | 2/1972 | Dietrich | 61/35 |
| 3,653,217 | 4/1972 | Williams | 61/45 B |
| 3,703,396 | 11/1972 | LaManche et al. | 117/21 |
| 3,859,409 | 1/1975 | Coonrod | 264/295 |
| 3,861,155 | 1/1975 | Steinberg et al. | 61/45 B |
| 3,893,303 | 7/1975 | Rotter | 61/45 B |
| 4,140,428 | 2/1979 | McLain et al. | 405/261 |

FOREIGN PATENT DOCUMENTS 2500375  7/1976  Fed. Rep. of Germany ...... 264/137

OTHER PUBLICATIONS

Advertisement–Coal Age Magazine–Mid–May 1975, vol. 80, No. 6.

Primary Examiner—Stephen J. Novosad
Attorney, Agent, or Firm—John E. Curley

[57] ABSTRACT

A mine bolt formed of continuous fiber reinforced pultruded rod-like reinforcing element is disclosed. This rod-like element includes at least one helical groove and/or protrusion along its length, with the continuous reinforcing fibers in the protrusions or surrounding grooves generally conforming to the helical pattern of the outer surface of the rod. The bolts formed by the instant invention also have utility in reinforcing such structures as mine roofs or concrete. The bolt of the instant invention comprises the above helically grooved rod fitted with an end cap that fits the helical turns of the grooved rod. The end cap may also serve as the mine roof plate.

12 Claims, 6 Drawing Figures

MINE ROOF BOLT AND END CAP

This is a division of application Ser. No. 969,528, filed Dec. 14, 1978, now U.S. Pat. No. 4,247,224.

BACKGROUND OF THE INVENTION

1. Field of the Invention

This invention relates to reinforcing members suitable for use as mine roof bolts, mine side bolts or in concrete reinforcing.

2. Prior Art

In mines it has been the practice to utilize mine roof bolts as an aid in holding the tunnel roof in place. The bolts are used on the sidewalls of mining tunnels.

At one time these bolts comprised steel rods with expandable fittings on the end which were inserted into drilled holes in the roof of the tunnels where the fittings expanded to hold the rod in place as it was used to bolt a plate to the roof of the tunnel. These bolts suffered from the disadvantage that the anchoring in the holes was not secure. Further the bolts were not as effective as desirable and very subject to corrosion by seepage of water.

More recently the use of steel rods which are inserted into resin bags have come into use. In this system a tubular bag containing separate bags of a polyester resin in paste form and a curing agent for the polyester are inserted into a hole drilled into the roof of the mine and then the steel rod is shoved through the tube breaking the bag and allowing the material to cure. The end of the rod extending from the roof is threaded and a plate is bolted to the end of the rod and held against the mine roof or sidewall. This system offers some advantages and is more effective than previous systems but it also suffers disadvantages in that the bolt, while somewhat protected from water seepage is not totally protected from such corrosion which both weakens the bolt and decreases its holding power. Further the steel rod and plate are heavy limiting the number that can be transported and installed by each miner. Further the steel rods generally do not provide thorough mixing of the resin catalyst.

Therefore, there remains a need for a mine roof or sidewall bolt that would have greater holding power, not be subject to water corrosion and be lighter for easier installation.

There is also a need for a fastening device for utilization in reinforcing of concrete with filament reinforced resin bars. There is a need for end-caps for the filament reinforced resin bars which could be utilized to hold together forms for the concrete pouring or to hold together filament reinforced resin rod reinforcing structures in the proper shape prior to the pouring of the concrete.

SUMMARY OF THE INVENTION

It is therefore an object of this invention to overcome the disadvantages of the prior processes and products.

It is another object of this invention to form a roof bolt of greater holding power.

It is another object of this invention to form a roof bolt that is resistant to corrosion.

It is a further additional object of this invention to form a roof bolt of lighter weight.

It is again another object of this invention to permit the utilization of pultruded fiber reinforced resin reinforcing bolts and roof bolts.

These and other objects of the invention are generally accomplished by provision of an end-cap for a pultruded reinforcing rod that has helically arranged grooves or protrusions on the surface of the rod. The end-cap has an interior cavity that conforms with the helical structure of the protrusions on the reinforcing rod allowing it to be screwed onto the rod. The end-cap may comprise a plate for mine roof reinforcement or be adapted to hold a separate plate for mine roof reinforcement.

In a preferred form of the invention the rod is reinforced with glass fiber strand which is generally uniformly distributed throughout the cross-section of the rod including strand in the protruding portion. The end-cap in addition to comprising a plate for roofing reinforcement also incorporates a head that allows attachment of means for turning of the plate onto the rod after the rod is inserted through the resin bag into the roof. The turning of the plate and rod allows efficient mixing of the resin and catalyst due to the efficient mixing of the helically arranged protrusions.

DETAILED DESCRIPTION OF THE INVENTION

The reinforcing rods and mine bolts of the instant invention provide many advantages over prior reinforcing means. The mine bolts of the instant invention are light in weight allowing easier transportation and insertion of the bolt in walls and roofs of mines. Further the mine bolts are substantially completely resistant to corrosion by water and acidic water commonly found in mines. Still further the helical configuration of protrusions causes very good mixing of the resin and catalyst such that the curing of the resin is complete for good bonding with the rock of the roof or sidewall of the mine. The rods and end caps of the instant invention also offer significant advantages when utilized in reinforcement of concrete. The rods are resistant to corrosion such as the salt run off in roads or bridges formed of reinforced concrete. Further the end caps allow utilization of fiber reinforced resins as the supporting reinforcement to hold together forms into which concrete is poured. With the utilization of the end caps and reinforcement rods of the instant invention the use of any wire or steel reinforcement to hold together reinforcing elements would not be necessary. The deterioration of steel reinforcing rods by corrosion is one of the major causes of reinforced concrete failure. The means for achieving the advantages will be clear from the detailed description below especially with reference to the drawings.

Figure 1:
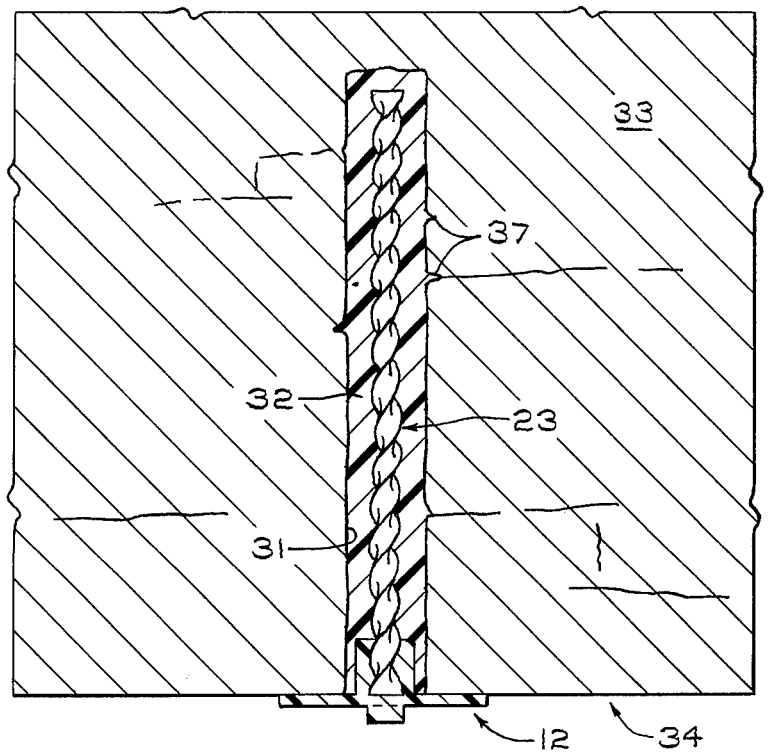
FIG. 1 is a cross-sectional view of a mine bolt of the invention in place in a mine roof.

FIG. 1 illustrates in cross-section a mine roof bolt of the invention installed in a mine roof. The rock 33 of the mine roof 31 has a holed 34 drilled therein to receive the mine bolt. The diameter of the hole drilled conventionally is around 1 and a ¼ inches, however any suitable size of the hole may be utilized. Such reinforcing bolt holes generally are drilled on about 4 foot centers and extend between 4 and 6 feet into the roof rock. Into the hole 34 is inserted the helically surfaced pultruded reinforcing rod of the invention 23. The rod generally would have a diameter of between about ¾" and about ⅞" for a mine roof bolt. The rods are formed by the novel process of co-pending application U.S. Pat. application Ser. No. 867,852 filed Jan. 9, 1978 by Charles W. Killmeyer, now U.S. Pat. No. 4,194,873, which is hereby incorporated by reference. The pultruded rods of Ser. No. 867,852 are exceptional in that the glass fibers follow the pattern of the protrusions on the surface of the rod such that the protrusions forming the helical pattern are reinforced. Previous reinforcing bars were unsatisfactory because the protrusions generally would not carry the fibers as the protrusions were molded on after formation of the rod. Alternatively if the rods were pultruded, the protrusions could not be in a helical pattern and did not hold well in the roof. The reinforcing rod 23 is surrounded by the resin 32 which is a polyester resin. In one preferred form the resin is inserted in the form of a tube called a resin bag into the hole. The resin bag comprises two separate polyethylene film tubes one of which contains a polyester resin filled with an organic filler to form a paste. The other polyethylene bag contains benzoyl peroxide catalyst in paste form. The insertion of the reinforcing rod 23 breaks the polyethylene bags and as the rod is turned during insertion and fastening of the end cap the resin is thoroughly mixed such that it hardens bonding to both the rod and the rock forming the exterior of the drilled hole. The resin also seeps into the crevices of the rock such as shown at 37. The end cap of the bolt of the invention 12 is adapted to mate with the helical protrusions on the reinforcing rod 23.

Figure 4:
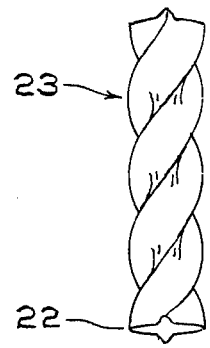
FIG. 4 is a prospective view of a fragmentary portion of the pultruded rod that forms a portion of the bolt of the invention.
Figure 3:
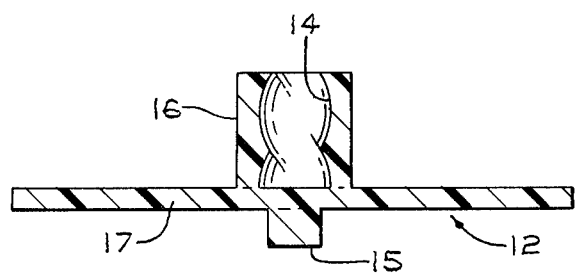
FIG. 3 is a cross-sectional view of the end plate of the mine bolt of the invention.
Figure 2:
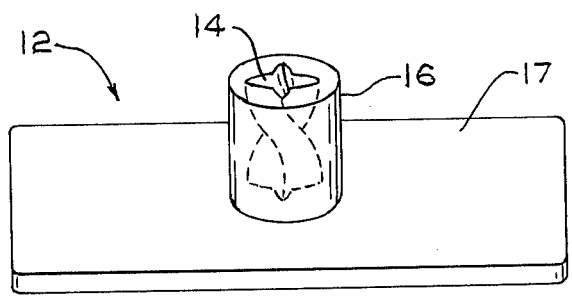
FIG. 2 is a prospective view of the end plate for the mine bolt of the invention.
Figure 5:
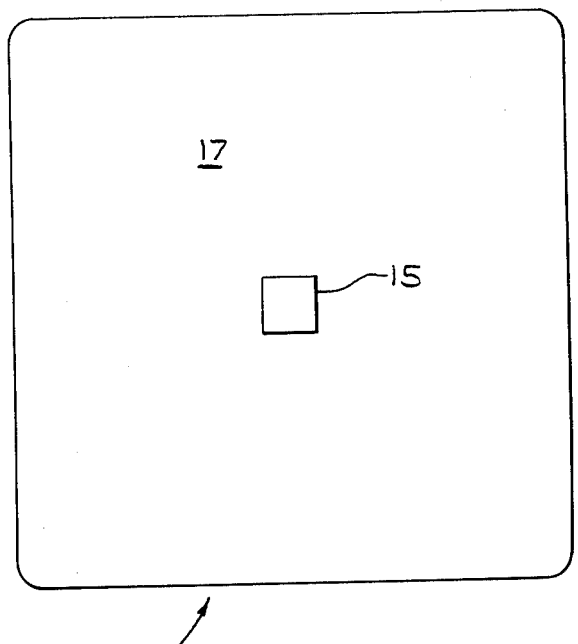
FIG. 5 is an end view of the end plate of the mine bolt of the invention.

With reference to FIGS. 2, 3 and 4 there is shown the end cap of the invention comprising a interior cavity 14 having a threaded interior which is the mirror image or female surface matching the male surface of the reinforcing rod 23. The end cap may be screwed onto the helical protrusions of the reinforcing rod 23. The cavity 14 is contained within neck 16. Forming an integral body with the neck piece 16 is a plate 17 which acts to stabilize the roof or sidewall of the mine as the plate is inserted onto the reinforcing rod 23. The plate also has integrally molded thereto a nut 15 or other means for attaching means to rotate of the end cap as it mates with the protrusions 22 of the reinforcing rod 23. The means for turning the end cap 15 may be adapted to mate with any desired driving tool including standard size sockets.

Figure 6:
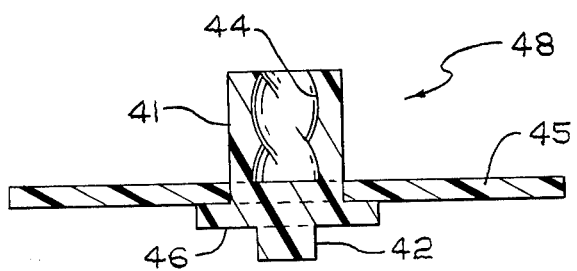
FIG. 6 is a cross-section of an alternate structure of the end cap and plate for the mine bolt of the instant invention.

FIG. 6 illustrates a variation of the end cap of the invention in which the plate does not form an integral part of the end piece. As illustrated in FIG. 6 the plate 45 forms a separate portion which is held by the end cap generally indicated as 48. The end cap 48 comprises a flange 46 which bares on the end plate 45 turning means 42 adapted to mate with any desired type of wrench or socket and the main body 41 of the end cap 48 which has cavity 44 adapted to mate with the reinforcing rod 23. While shown with an end plate 45 the end cap 48 of FIG. 6 also could be utilized to hold together forms for concrete reinforcement or to hold together interior reinforcing which will be completely covered by concrete after it is poured. The end cap of the invention by utilizing the helical configuration of protrusions on the novel rod of co-pending Ser. No. 867,852 achieves an advantage in that threading of the rod does not have to be accomplished as in the case of prior roof bolts and concrete reinforcement.

The end cap of the invention may be assisted in bonding to the reinforcing rod by the use of resin adhesive in the end cap which would bond to the reinforcing rod after it is inserted into the end cap. Generally enough resin would be available from the resin bag to aid in this bonding in the instance of the use as a roof bolt. However, for concrete reinforcing or if desired for the roof bolt, an additional adhesive could be placed in the end cap prior to insertion or screwing on of the reinforcing rod.

While the invention has been described for use with the conventional mine resin bag system as a roof or side anchor bolt in mining, the bolt also could be used with other resin systems in which the resin is injected into the hole or in which expandable anchors are utilized to hold a rod into a drilled hole. Such a use would be to hold wall brackets in a corrosive manufacturing or salt water exposed area.

Many variations may be made in the practice of this invention without departing from the concept disclosed here. For instance, while the plate is illustrated as square it could be of any desired shape such as rectangular, oval or round. Additionally while the reinforcing rod is illustrated as having four protrusions 22 forming a helical pattern on its surface the rod could be designed with any desired number of protrusions. Further the rod may be formed with any desired amount of helical configuration to give adequate mixing and adequate contact of the threads with the end piece. The end piece may be formed of greater length in order to increase direct contact with the rod.

Further, the reinforcing rods with the mating end caps may be utilized for purposes other than concrete reinforcement or mine roof and side bolts. For instance, the rods and end caps could be utilized to hold retaining walls or underwater structures that are exposed to a corrosive environment such as salt water.

Though, while the invention has been described with reference to particularly preferred embodiments thereof it is not intended to be limited thereby except as appears in the accompanying claims.

I claim:

1. A reinforcing bolt and end cap comprising a fiber reinforced resin rod having one or more continuous protrusions and/or grooves on the surface and helically along the length thereof wherein the fibers in said protrusions and surrounding the grooves follow the pattern of the protrusions and/or grooves along the rod such that at any point along the length of the rod the same fibers will be located in said protrusions and surrounding said grooves and an end cap on said rod comprising a planar surface and a recessed cavity having protrusions and grooves, its inner surface corresponding to the helical pattern of protrusions and/or grooves on said rod.

2. The bolt of claim 1 further comprising means for attaching turning means to said end cap.

3. The bolt of claim 1 wherein said end cap is adhesively attached to said rod.

4. The bolt of claim 1 wherein said resin is a thermoset resin.

5. The bolt of claim 1 wherein said resin is a polyester, polyurethane, vinyl ester or epoxy.

6. The bolt of claim 1 wherein said resin is a thermoplastic resin.

7. The bolt of claim 1 wherein said resin is a nylon, polyethylene, polypropylene or polystyrene.

8. The bolt of claim 1 wherein said fiber comprise glass, Kevlar, nylon, polyester, carbon, graphite, an amide or an imide or combinations thereof.

9. A reinforcing element and end cap comprising a fiber reinforced resinous rod having one or more continuous protrusions on the surface and along the length thereof wherein said fibers in said protrusion and surrounding the grooves follow the helical pattern of the protrusions and/or grooves around the surface of the rod, such that at any point along the length of the rod the same fibers will be located in said protrusions and surrounding said grooves and an end cap on said rod comprising a recessed cavity having protrusions and grooves, its inner surface corresponding to the helical pattern of the protrusions and/or grooves on said rod.

10. The element of claim 9 wherein said end cap comprises means for attaching turning means to said end cap.

11. The element of claim 9 wherein said end cap has a planar portion generally aligned perpendicular to said cavity.

12. The element of claim 9 wherein there is a cap on each end of said rod.

* * * * *